Patented Mar. 25, 1952

2,590,257

UNITED STATES PATENT OFFICE 2,590,257

GUANIDINE SYNTHESIS

Johnstone S. Mackay, Old Greenwich, Conn., assignor to American Cyanamid Company, New York, N. Y., a corporation of Maine No Drawing. Application March 31, 1949, Serial No. 84,722

5 Claims. (Cl. 260—564)

The present invention relates to the production of guanidine values, and more particularly, to a new method whereby such values may be provided in the form of guanidine sulfates.

An object of the present invention is to provide guanidine values, and more specifically, guanidine sulfates at low cost by a new process employing cheap reactants and simple apparatus and procedures.

Another object of the present invention is to provide guanidine values employing urea as a starting material.

Other objects will be apparent from the discussion that follows hereinafter.

It has now been found that urea may be heated with sulfamide, a compound of the formula, $NH_2SO_2NH_2$, to form guanidine sulfate.

In general, reaction is carried out by simply mixing the reactants and thereafter heating to a suitable temperature for a short period of time to permit the reaction to occur. Thereafter, the reaction mixture is cooled, extracted with water to obtain an aqueous solution of guanidine sulfate, from which the same or the free guanidine or other guanidine salts may be isolated by conventional procedures, detailed more fully hereinafter. While the reaction is most conveniently carried out by fusion of the reactants, the use of suitable solvents and/or diluents is also permissible.

While the reaction may be carried out over a wide range of temperatures, it is preferred to employ a temperature within the range of substantially 190°–300° C., and more preferably, a temperature within the range of substantially 210°–250° C. At temperatures substantially below 190° C., the reaction progresses slowly, making the use of such temperatures somewhat impractical, whereas at the temperatures substantially above 250° C., the decomposition of the desired guanidine sulfates begins to become appreciable.

The following specific examples are set forth below to more particularly describe the process of the present invention. The parts are by weight.

Example 1

6 parts of sulfamide and 9 parts of urea (mole ratio 1:2) were heated for 2 hours in an open flask at a temperature of 220° C. The reaction mass was cooled to room temperature, scraped from the flask, and it was found that 34.3% of the original urea had been converted to guanidine, which appeared in the reaction mass as the sulfate.

Example 2

Another experiment was made using the procedure of Example 1, in which the mole ratio of sulfamide to urea was 1:1, with a 61.4% conversion of urea to guanidine values.

Example 3

A third experiment was made using the procedure of Example 1, using a sulfamide to urea mole ratio of 2:1, with a 74% conversion of the urea to guanidine sulfate.

It has been found that an excess of sulfamide over urea increases the conversion of urea to guanidine; however, the cost of the excess sulfamide becomes appreciable beyond the ratio 2:1, sulfamide to urea, and a mole ratio of sulfamide to urea in the range of 1:1 to 2:1 is preferred. The use of higher proportions of the sulfamide results in somewhat higher yields of guanidine values, but such increased yields are not sufficiently great to offset the cost of using the additional sulfamide. Because of such economic considerations, the guanidine sulfate usually resulting from the process of the present invention is predominantly in the form of the diguanidine sulfate. Obviously, the more acidic monoguanidine sulfate may be readily prepared therefrom by acidifying an aqueous solution of the diguanidine sulfate with sulphuric acid. In general, at a pH of about 2 the salt is predominantly in the form of the monoguanidine sulfate, whereas at a pH of about 7 the sulfate is predominantly in the form of the diguanidine sulfate.

The isolation of the guanidine sulfate may be effected by any of the conventional means, such as by cooling or evaporating to cause crystallization, or by adding a water-miscible organic liquid, such as ethanol, to decrease the solubility of the salt and cause its precipitation. Because of the appreciable solubility of the sulfate, the latter technique is usually resorted to, despite the cost of the alcohol. The guanidine molecule being that desired, said guanidine values can also be isolated by forming a less soluble salt, such as a picrate, a carbonate, or a phosphate. The preparation of such less soluble salts is effected by simply adding an equivalent amount of the corresponding acid or metallic or ammonium salts of the corresponding acid to the aqueous solution of the sulfate, and inducing crystallization by any conventional means, such as those aforementioned.

The guanidine values may also be recovered as free guanidine by dissolving the dry reaction mixture in an alcohol, such as ethanol, adding an excess of potassium hydroxide to precipitate the sulfate ion as potassium sulfate, and thus provide an alcoholic solution of the free base. Such free guanidine may be isolated from solution, if desired, by conventional procedures, although generally some difficulty is experienced in applying the usual methods for inducing crystallization in the isolation of the guanidine.

The guanidine sulfates provided by the process of the present invention are valuable chemicals, being useful as fireproofing agents, in the preparation of resins and blueprint materials, such as intermediates in the preparation of chemotherapeutic agents, explosives, pharmaceuticals, surface-active agents, and the like.

While the invention has been described with particular reference to specific embodiments, it is to be understood that it is not to be limited thereto but is to be construed broadly and restricted solely by the scope of the appended claims.

I claim:
1. A process of converting urea to guanidine-containing salt comprising heating urea at a temperature between 190° and 300° C. while in contact with sulfamide.
2. The process according to claim 1 in which the reaction is conducted in a closed reaction zone.
3. The process according to claim 1 in which the temperature is within the range 220° to 240° C.
4. The process according to claim 1 in which the urea:sulfamide mol ratio is approximately 1:0.5–2.5.
5. The process of converting urea to guanidine-containing salt comprising heating a mixture consisting essentially of urea and sulfamide in the respective mol ratio of about 2:1 at a temperature within the approximate range 220° to 240° C.

JOHNSTONE S. MACKAY.

REFERENCES CITED

The following references are of record in the file of this patent:

UNITED STATES PATENTS

| Number | Name | Date |
|---|---|---|
| 2,212,152 | Cupery | Aug. 20, 1940 |
| 2,464,247 | Mackay | Mar. 15, 1949 |
| 2,524,054 | Hill | Oct. 3, 1950 |

OTHER REFERENCES

Franklin: "Nitrogen System of Compounds" (1935), pp. 167–169.